(12) United States Patent
Sakamoto et al.

(10) Patent No.: US 10,077,979 B2
(45) Date of Patent: Sep. 18, 2018

(54) ESTIMATION APPARATUS

(71) Applicant: DENSO CORPORATION, Kariya, Aichi-pref. (JP)

(72) Inventors: Mai Sakamoto, Konan (JP); Koichiro Suzuki, Yokohama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 301 days.

(21) Appl. No.: 14/772,691

(22) PCT Filed: Mar. 4, 2014

(86) PCT No.: PCT/JP2014/055403
§ 371 (c)(1),
(2) Date: Sep. 3, 2015

(87) PCT Pub. No.: WO2014/136754
PCT Pub. Date: Sep. 12, 2014

(65) Prior Publication Data
US 2016/0018219 A1   Jan. 21, 2016

(30) Foreign Application Priority Data
Mar. 4, 2013  (JP) .................................. 2013-041882

(51) Int. Cl.
  G01B 21/16  (2006.01)
  G01S 13/38  (2006.01)
  (Continued)

(52) U.S. Cl.
  CPC .............. *G01B 21/16* (2013.01); *G01S 11/02* (2013.01); *G01S 13/347* (2013.01); *G01S 13/38* (2013.01);
  (Continued)

(58) Field of Classification Search
  CPC ..... G01B 21/16; G01B 13/584; G01S 13/584; G01S 11/02; G01S 13/347; G01S 13/726; G01S 13/38; G01S 13/42
  See application file for complete search history.

(56) References Cited

U.S. PATENT DOCUMENTS 6,023,237 A   2/2000   Kunert
6,763,318 B1  7/2004   Winter et al.
(Continued)

FOREIGN PATENT DOCUMENTS

JP   H08-122432 A   5/1996
JP   H08-124080 A   5/1996
(Continued)

OTHER PUBLICATIONS

International Search Report (translated version); International Application No. PCT/JP2014/055403, filed Mar. 4, 2014; 10 pages.
(Continued)

*Primary Examiner* — Joseph C Nicely
(74) *Attorney, Agent, or Firm* — Knobbe, Martens, Olson & Bear, LLP

(57) ABSTRACT

An estimation apparatus includes a distance estimator. The distance estimator performs regression analysis using, as samples, an observation of distance and an observation at each time within a predetermined period obtained by an observer. The estimation apparatus estimates that a value of the distance upon a value of a displacement calculated in accordance with a regression equation based on the regression analysis being zero shows a value of the distance to the forward object at a start time.

12 Claims, 5 Drawing Sheets

(51) Int. Cl.
  *G01S 13/34* (2006.01)
  *G01S 13/72* (2006.01)
  *G01S 11/02* (2010.01)
  *G01S 13/58* (2006.01)
  *G01S 13/42* (2006.01)

(52) U.S. Cl.
  CPC .......... *G01S 13/584* (2013.01); *G01S 13/726* (2013.01); *G01S 13/42* (2013.01)

(56) References Cited

U.S. PATENT DOCUMENTS

| | | | |
|---|---|---|---|
| 2010/0271258 A1 | 10/2010 | Takabayashi et al. | |
| 2011/0112740 A1* | 5/2011 | Hashimoto | F02D 17/02 701/70 |
| 2014/0142805 A1* | 5/2014 | Frye | B60R 16/023 701/36 |
| 2017/0131411 A1* | 5/2017 | Yun | G01S 19/46 |
| 2017/0184403 A1* | 6/2017 | Kumabe | G01C 21/16 |

FOREIGN PATENT DOCUMENTS

| | | |
|---|---|---|
| JP | 2001-272466 A | 10/2001 |
| JP | 2004-251660 A | 9/2004 |
| JP | 2008-203095 A | 9/2008 |
| JP | 2008-249427 A | 10/2008 |
| JP | 2009-052984 A | 3/2009 |
| JP | 2010-091407 A | 4/2010 |
| JP | 2010-256083 A | 11/2010 |
| JP | 2011-220727 A | 11/2011 |
| JP | 2012-145367 A | 8/2012 |
| JP | 2013-120127 A | 6/2013 |
| WO | 20141136754 A1 | 9/2014 |

OTHER PUBLICATIONS

International Preliminary Report on Patentability; International Application No. PCT/JP2014/055403; Filed: Mar. 4, 2014 (with English translation).

* cited by examiner

ESTIMATION APPARATUS

TECHNICAL FIELD

The present disclosure relates to estimation apparatuses for estimating, for example, distances of forward objects.

BACKGROUND ART

Conventional estimation apparatuses are known, which estimate the dynamics of a forward object using a state estimation filter, such as an alpha-beta ($\alpha$-$\beta$) filter or a Kalman filter. Such an estimation apparatus, at the start of estimation, an initial value of a state quantity as the dynamic state of the state estimation filter according to observations associated with the dynamics of the forward object.

Note that the observations may have errors. An initial value, which greatly deviates from a real value, provided to the state estimation filter due to an error may result in the following problem. Specifically, great deviation of the initial value, which is based on state estimation, from the real value may make it difficult to estimate a state quantity with a high accuracy for a while after start of estimation by the estimation apparatus.

A technology to address the problem is known, which performs linear regression analysis of observations, and sets, at the start of estimation, an initial value for a state estimation filter according to the results of the linear regression analysis of observations (see patent document 1). This technology sets, as an initial value for the state estimation filter at the start of estimation, an initial position or an initial velocity of each of forward objects according to the results of execution of the linear regression analysis for the group of positions of the forward objects observed by a radar device.

CITATION LIST

Patent Document

[Patent Document 1] Japanese Patent Application Publication No. 2001-272466

SUMMARY OF INVENTION

Technical Problem

Radar apparatuses receive an echo signal based on a radar wave transmitted to a forward object, and analyze the received signal to thereby observe the distance to the forward object or the velocity of the forward object. The observed distance from the radar device to the forward object may likely be lower in accuracy than the observed velocity of the forward object obtained as frequency information based on Doppler shift.

In particular, let us consider a case where a dual frequency continuous wave radar apparatus is used to observe the distance to a forward object from the radar apparatus and the velocity of the forward object. In this case, an observed velocity of the forward object is obtained from frequency information about a signal received by the radar device. In contrast, an observed distance to the forward object from the radar device is obtained from phase information about the signal received by the radar device. For this reason, the observation accuracy of the distance to a forward object from a dual frequency continuous wave radar apparatus is much lower than that of the velocity of the forward object.

That is, the observation accuracy of a distance obtained from phase information is inferior to that of a velocity obtained from frequency information (see, for example, equation [3.41] on pp. 56-57 of "Fundamentals of Statistical Signal processing vol. 1: Estimation Theory" written by Steven M. Kay.

Let us focus on such a method of (1) Receiving an echo signal based on a radar wave transmitted to a forward object (2) Analyzing the received signal to thereby observe the distance to the forward object or the velocity of the forward object.

Like the conventional technology, if this method merely performs linear regression analysis of an observed distance, and sets an initial value for an state estimation filter according to the results of the linear regression analysis of observations, a large deviation of the initial value from a real value may make it difficult to estimate the state of a forward object with a high accuracy at an early stage of estimation.

In view the problem set forth above, one aspect of the present disclosure is to provide technologies, which are capable of estimating a distance to a forward object with higher accuracy according to one or more observations obtained from an observation apparatus that observes the distance to a forward object and velocity of a forward object.

Another aspect of the present disclosure is to provide technologies, which are capable of setting an initial value of a state quantity to be given to a state estimation filter with higher accuracy.

Means for Solving Problem

An estimation apparatus according to an exemplary aspect of the present disclosure is configured to estimate a distance to a forward object according to an observation of the velocity at each of times within a predetermined period by an observer that observes the distance to the forward object and the velocity of the forward object. The estimation apparatus includes a displacement calculation unit and a distance estimation unit.

The displacement calculation unit uses observations of the velocity of the forward object observed by the observer at the respective times within the predetermined period to calculate, for each of the times within the predetermined period, a temporal integral value of the observations from a start time of the predetermined period to a corresponding one of the times. The temporal integral value calculated for each of the times serves as an observation of a displacement of the forward target within the start time to a corresponding one of the times.

The distance estimation unit performs regression analysis using, as samples, observations of the distance and the calculated displacement observations at the respective times within the predetermined period. The regression analysis is based on the distance as an objective variable and the displacement as an explanatory variable.

The distance estimation unit estimates that a value of the distance upon a value of the displacement calculated in accordance with a regression equation based on the regression analysis being zero shows a value of the distance to the forward object at the start time.

Upon an accuracy of observation of the velocity being higher than that of observation of the distance, the estimation apparatus estimates the distance to the forward object at the start time of the predetermined period with higher accuracy in comparison to a conventional technology that performs regression analysis using, as samples, observations of the distance in accordance with the relationship between the time and the distance.

Thus, the distance at the start time of the predetermined period and the displacement observation at each of the times enable the distance to the forward object at each of the times to be estimated with higher accuracy. Specifically, the distance estimation unit can be configured to estimate, as a value of the distance at each of the times, the sum of the estimated value of the distance at the start time and the displacement observation at a corresponding one of the times.

The estimation apparatus can be configured as follows when the observer is designed to observe an orientation of the forward object. Specifically, the estimation apparatus includes a position estimation unit for estimating, according to the value of the distance at each of the times estimated by the distance estimation unit and observations of the orientation by the observer, a position of the forward object in an orthogonal coordinate system at each of the times. The estimation apparatus equipped with the position estimation unit estimates the position of the forward object at each of the times with higher accuracy.

In addition, when the estimation apparatus is configured to set an initial value of a state quantity, the estimation apparatus is capable of estimating, for a state estimation filter, an initial value of a state quantity of the forward object with higher accuracy.

Specifically, the estimation apparatus, which includes a state estimation unit for estimating the position and the velocity of the forward object using a state estimation filter, enables the following initial value setting unit to be provided.

Specifically, the estimation apparatus is provided with the initial value setting unit. The initial value setting unit sets, as initial values of the respective position and velocity of the forward object for the state estimation filter, a position and velocity of the forward object at a time corresponding to the initial values. The position and velocity at the time corresponding to the initial values are specified from the position estimated by the position estimation unit.

The estimation apparatus enables proper initial values to be set for the state estimation filter according to the observations obtained by the observer. Thus, the estimation apparatus enables the state quantities of the forward object to be estimated with higher accuracy at an early stage of the estimation started by the state estimation unit.

DESCRIPTION OF EMBODIMENTS

The following describes an embodiment of the present disclosure with reference to accompanying drawings.

Figure 1:
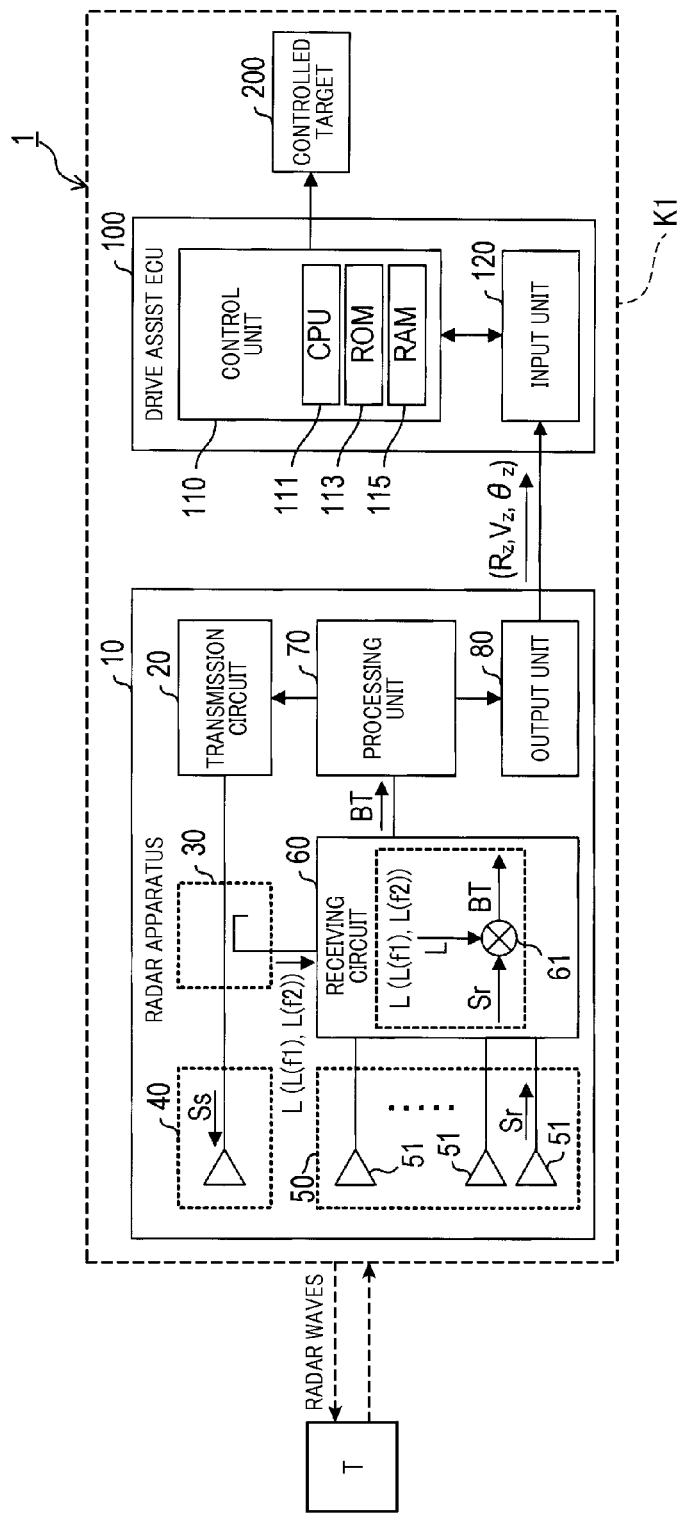
FIG. 1 is a block diagram illustrating a schematic structure of an in-vehicle system according to an embodiment of the present disclosure.

An in-vehicle system 1 illustrated in FIG. 1 includes a radar apparatus 10 and a drive assist ECU 100. The in-vehicle system 1 is installed in a vehicle, such as a four-wheel vehicle, K1.

The radar apparatus 10 is adapted to transmit radar waves, receive echoes based on the radar waves, and observe, based on the received signals, a distance R to a target T that is a forward object to which the radar waves are transmitted, a velocity of the target T, and an orientation θ of the target T.

The radar apparatus 10 inputs the observations ($R_z$, $V_z$, $θ_z$) to the drive assist ECU 100. Specifically, the radar apparatus 10 of this embodiment is configured as a dual frequency continuous wave (CW) radar apparatus.

The radar apparatus 10 includes a transmission circuit 20, a distributor 30, a transmission antenna 40, a receiving antenna 50, a receiving circuit 60, a processing unit 70, and an output unit 80.

The transmission circuit 20 is designed to supply transmission signals Ss to the transmission antenna 40. The transmission circuit 20 inputs a high frequency signal within a millimeter waveband to the distributor 30 located upstream of the transmission antenna 40. Specifically, the transmission circuit 20 alternately generates a high frequency signal with a first frequency f1 and a high frequency signal with a second frequency f2 slightly different from the first frequency f1 at short intervals, and inputs them to the distributor 30.

The distributor 30 distributes the high frequency signals input from the transmission circuit 20 to the transmission signals Ss, a local signal L(f1) having the first frequency f1 of the corresponding high frequency signal, and a local signal L(f2) having the second frequency f2 of the corresponding high frequency signal.

The transmission antenna 40 transmits, based on the transmission signals Ss supplied from the distributor 30, radar waves having frequencies corresponding the transmission signals Ss to the front of the vehicle K1. This causes a radar wave having the first frequency f1 and a radar wave having the second frequency f2 to alternately output as illustrated in the left region of FIG. 2.

On the other hand, the receiving antenna 50 is designed to receive radar waves, i.e. echoes, reflected from targets. The receiving antenna 50 is configured as, for example, a linear array antenna in which a plurality of antenna elements 51 are aligned. A receiving signal Sr of an echo from each antenna element 51 is input to the receiving circuit 60.

The receiving circuit 60 processes the receiving signal Sr input from each antenna element 51 constituting the receiving antenna 50 to generate beat signals BT for each antenna element 51, and output it. Specifically, the receiving circuit 60 mixes the receiving signal Sr with the local signals L(f1) and L(f2) input from the distributor 30 for each antenna element 51, thus generating and outputting the beat signals BT for each antenna element 51.

For example, the receiving circuit 60 includes, as the processes to output the beat signals BT, (i) A process to amplify the receiving signal Sr input from each antenna element 51

(ii) A process to mix the amplified receiving signal Sr input from each antenna element 51 with the local signals L(f1) and L(f2) input from the distributor 30 to thereby generate the beat signals BT for each antenna element 51

(iii) A process to remove unwanted signal components from the beat signals BT for each antenna element 51

(iv) A process to convert the beat signals BT, from which the unwanted signal components have been removed, into digital data for each antenna element 51.

The above configured receiving circuit 60 outputs the generated beat signals BT for each antenna element 51 as converted digital data. The beat signal BT output for each antenna element 51 are input to the processing unit 70.

Figure 2:
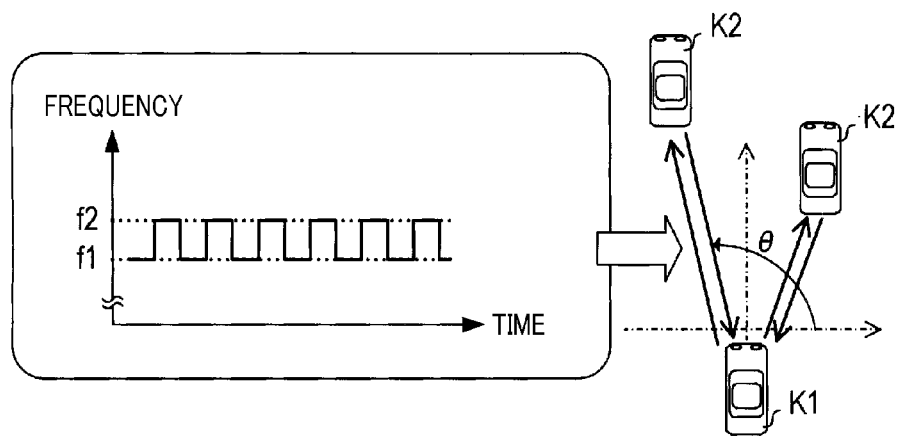
FIG. 2 is a view describing how radar waves are transmitted and received according to the embodiment of the present disclosure.

The processing unit 70 analyzes the beat signals BT for each antenna element 51 to thereby calculate observations ($R_z$, $V_z$, $\theta_z$) for each target T that has reflected radar waves. The observation $R_z$ represents an observation of the distance R from the radar apparatus 10, in other words, the vehicle K1 incorporating the radar apparatus 10, to each target T. The observation $V_z$ represents an observation of the relative velocity V of each target T relative to the vehicle K1. The observation $\theta_z$ represents an observation of the orientation $\theta$ of each target T with respect to the reference that is the alignment direction of the antenna elements 51; the alignment direction is perpendicular to the longitudinal direction of the vehicle K1 (see the right region of FIG. 2). Solid arrows illustrated the right region of FIG. 2 schematically represent propagating directions of radar waves under a situation where radar waves are reflected from forward vehicles K2 as targets T in front of the vehicle K1.

There are known methods of calculating the observations ($R_z$, $V_z$, $\theta_z$) for each target T according to the beat signals BT for the corresponding target T. Thus, the following used by the processing unit 70 simply describes a method of calculating the observations ($R_z$, $V_z$, $\theta_z$).

To calculate the observations ($R_z$, $V_z$, $\theta_z$) for each target T, the processing unit 70 performs Fourier transform on a first beat signal and a second beat signal included in the beat signals BT for each antenna element 51. This converts the first and second beat signals into signals in a frequency domain.

The first beat signal is the beat signal BT generated based on the mixture of the receiving signal Sr with the local signal L(f1) with the first frequency f1 by the mixer 61. The second beat signal is the beat signal BT generated based on the mixture of the receiving signal Sr with the local signal L(f2) with the first frequency f2 by the mixer 61.

Because time required for transmission and receipt of radar waves is minute, the first beat signal includes echo components of radar waves having the first frequency f1, and the second beat signal includes echo components of radar waves having the second frequency f2.

After the transformation, the processing unit 70 calculates averaged spectrums in the power spectrums of the first and second beat signals for the respective antenna elements 51 according to the frequency-domain signals, i.e. the Fourier-transformed first and second beat signals, for the respective antenna elements 51. Then, the processing unit 70 detects, based on the averaged spectrums, one or more frequencies whose power is equal to or more than predetermined threshold; the one or more frequencies are referred to as peak frequencies.

If multiple peak frequencies are detected, it is estimated that there are plural targets T. If the only one peak frequency is detected, it is estimated that there is a single target T. The signal components of the first and second beat signals corresponding to a peak frequency correspond to echo components of a corresponding target T. Note that the difference between the peak frequencies for the first and second beat signals can be ignored because the difference between the first frequency f1 and the second frequency f2 is minute.

Thereafter, the processing unit 70 calculates, for each peak frequency, the observation $V_z$ of the relative velocity V for the corresponding target T. In addition, the processing unit 70 calculates, for each peak frequency, the observation $R_z$ for the distance R to the corresponding target T according to the difference in phase between the echo component of the first beat signal BT corresponding to the peak frequency and the second beat signal BT corresponding to the peak frequency. The processing unit 70 calculates, for each peak frequency, the observation $\theta_z$ for the orientation $\theta$ to the corresponding target T according to the difference in phase between an antenna element for the echo component of the first beat signal BT corresponding to the peak frequency and a different antenna element for the echo component of the second beat signal BT corresponding to the peak frequency.

As described above, the processing unit 70 calculates, based on frequency information of the beat signals BT obtained for each antenna element 51, the observation $V_z$ of the relative velocity V for each target T. In addition, the processing unit 70 calculates, based on phase information of the beat signals BT obtained for each antenna element 51, the observations $R_z$ and $\theta_z$ of the distance R and the orientation $\theta$ for each target T.

Then, the processing unit 70 inputs the observations ($R_z$, $V_z$, $\theta_z$) for each target T to the drive assist ECU 100 via the output unit 80.

On the other hand, the drive assist ECU 100 includes a control unit 110 and an input unit 120. The control unit 110 performs state estimation for each target T according to the observations ($R_z$, $V_z$, $\theta_z$) for the corresponding target T. Based on the results of estimation, the control unit 110 performs a process for assisting a driver's driving of the corresponding vehicle.

Specifically, the control unit 110 includes a CPU 111, a ROM 113, and a RAM 115. The CPU 111 executes processes in accordance with various programs. The ROM 113 has stored therein the various programs. The RAM 115 is used as a working area of the CPU 111 when the CPU 111 performs the processes. An electrically data-writable non-volatile memory, such as a flash memory, can be used as the ROM 113. Execution of the programs by the CPU 111 enables the various processes including a process for state estimation and a process for drive assist to be implemented.

The control unit 110 performs, as the process for drive assist, a process to control, for example, a display device as one of controlled targets 200 to display, for the driving of the vehicle K1, a warning of approaching object. In addition, the control unit 110 performs, as the process for drive assist, a process to control, for example, a brake system or a steering system of the vehicle K1 as one of the controlled targets 200 to perform vehicle control that prevents the vehicle K1 from colliding with an approaching object to the vehicle K1.

The drive assist ECU 100 is connected to the controlled targets 200 via dedicated lines or an in-vehicle network such that the drive assist ECU 100 can control the controlled targets 200. Cooperative operations among electronic control units (ECUs) including, for example, an engine ECU, a brake ECU, and/or a steering ECU and the drive assist ECU implement vehicle control via the in-vehicle network. The engine ECU is an electronic control unit for controlling an internal combustion engine of the vehicle K1. The steering ECU is an electronic control unit for controlling the steering of the vehicle K1, and the brake ECU is an electronic control unit for controlling the braking of the vehicle K1.

Figure 3:
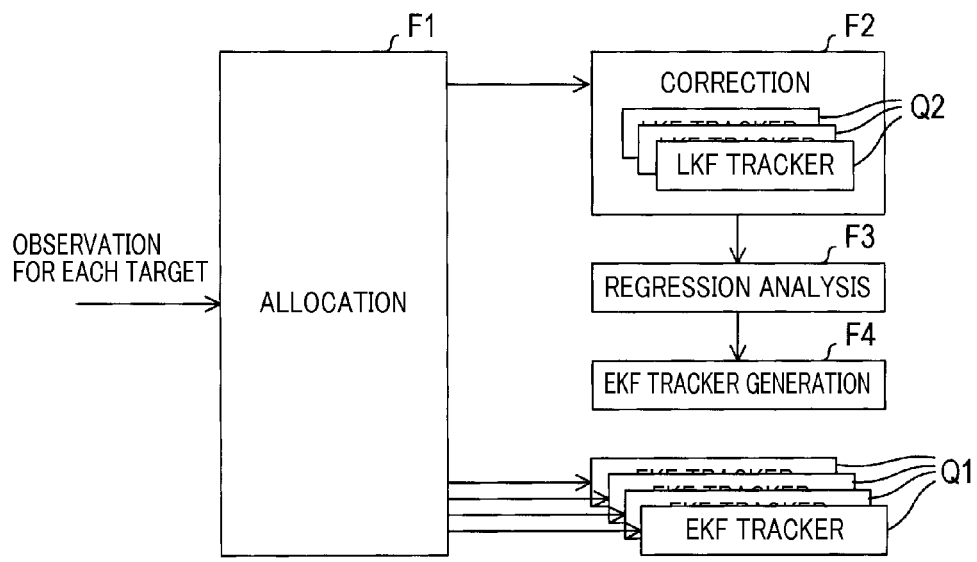
FIG. 3 is a functional block diagram illustrating functions implemented by a tracking routine according to the embodiment of the present disclosure.

In addition, the control unit 110 generates an EKF tracker Q1 for each target T when performing state estimation of the corresponding target T according to the observations ($R_z$, $V_z$, $\theta_z$) as illustrated in FIG. 3, and performs state estimation of each target T using the corresponding EKF tracker Q1. Such an EKF tracker is a tracker designed to perform state estimation of a corresponding target T using an extended Kalman filter (EKF).

As is well known, an extended Kalman filter is a Kalman filter for estimating state quantities based on a non-linear state space model that has been linearly approximated. Trackers are for example generated as objects or tasks to be executed by the control unit 110. The following describes processes implemented by trackers; each of the trackers is a subject for executing processes. This description means that the control unit 110 executes processes corresponding to trackers.

When generating an EKF tracker Q1 for each target T, i.e. starting estimation of state quantities of the corresponding target T, the control unit 110 sets initial values of the state quantities in the EKF tracker Q1 for the corresponding target T. For the initial-value setting, the control unit 110 executes functions F1 to F4 illustrated in FIG. 3 to implement specific operations.

Specifically, the control unit 110 allocates the observations ($R_z$, $V_z$, $\theta_z$) for each target T to a corresponding EKF tracker Q1, which represents an allocating function F1. If the observations ($R_z$, $V_z$, $\theta_z$) for each of new objects untracked by the EKF trackers Q1 are generated, the control unit 110 generates LKF trackers Q2, allocates the corresponding observations ($R_z$, $V_z$) to each of the LKF trackers Q2, and corrects, i.e. smooths, the observations ($R_z$, $V_z$), which represents a correcting function F2.

Such an LKF tracker Q2 is a tracker designed to perform state estimation of a corresponding target using a linear Kalman filter (LKF).

As is well known, a linear Kalman filter is a Kalman filter for estimating state quantities based on a linear state space model. An LKF tracker Q2 according to this embodiment is configured to estimate, in accordance with a simpler one-dimensional linear kinetic model, state quantities (R, V) including the distance R to a corresponding target and the relative velocity V relative to the corresponding target. Modeling movement of a corresponding target in the direction of the distance R enables the simpler one-dimensional linear kinetic model to be obtained.

An LKF tracker Q2 performs state estimation without using the observation $\theta_z$ for the orientation $\theta$. Specifically, an LKF tracker Q2 estimates state quantities (R, V) of a corresponding target using the observations ($R_z$, $V_z$).

The control unit 110 executes the following process using, as corrected observations ($R_c$, $V_c$), posterior estimates by an LKF tracker Q2 for the state quantities (R, V) of a corresponding target at each of times in the past than the start of the estimation.

Specifically, the control unit 110 performs, as the following process, a specific regression analysis using the corrected observations ($R_c$, $V_c$) as samples, which represents a regression analysis function F3. This performs high-accuracy estimation of the distance R to a corresponding target at each of the times in the past than the start of the estimation. Then, the control unit 110 generates an EKF tracker Q1 for a corresponding target, determines initial values of state quantities to be set for the EKF tracker Q1 using an estimated value $R_e$ of the distance R, and sets the initial values for the EKF tracker Q1, which represents an EKF tracker generating function F4.

Figure 4:
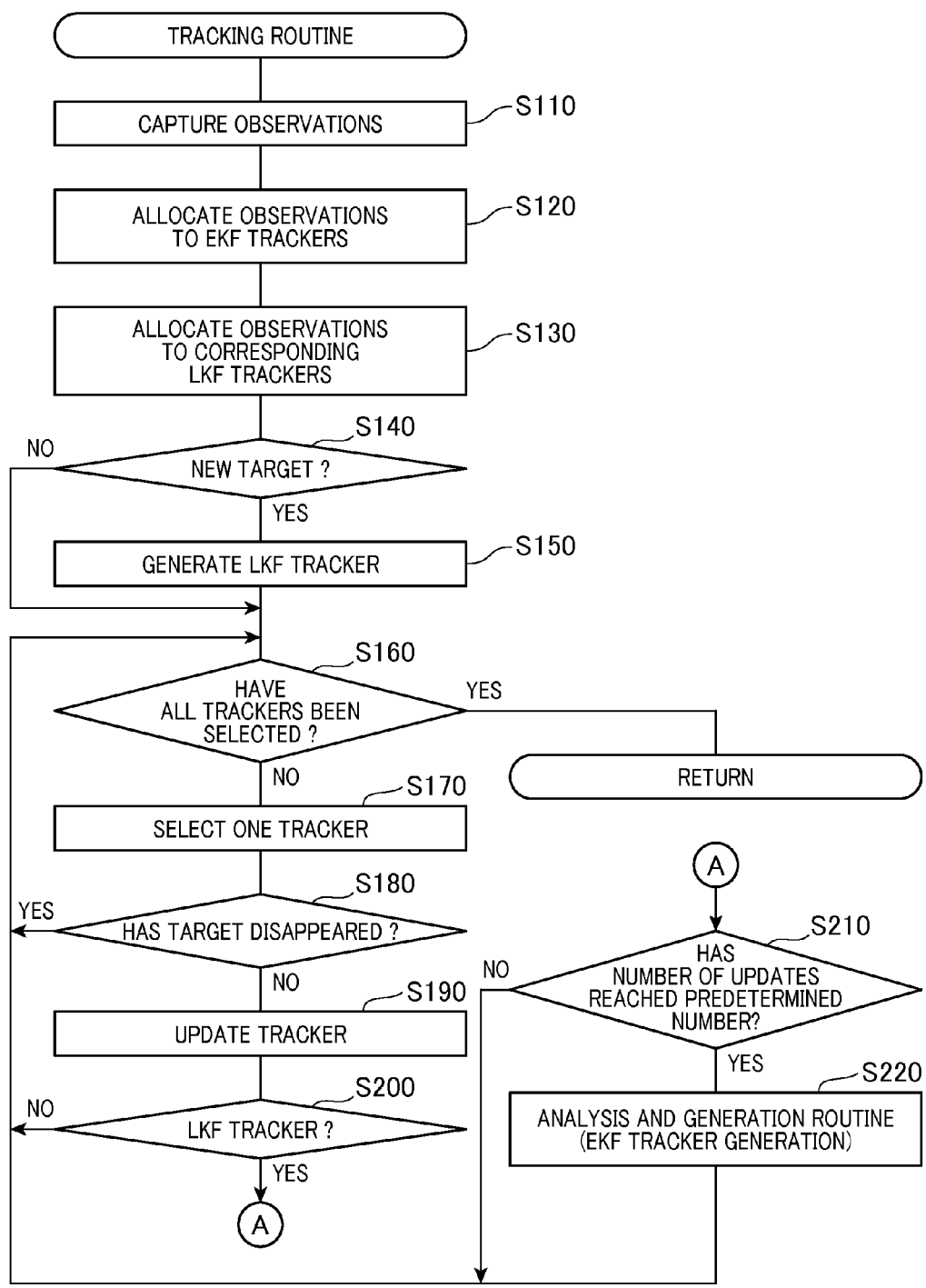
FIG. 4 is a flowchart illustrating the tracking routine carried out by a control unit illustrated in FIG. 1.

Specifically, the control unit 110 repeatedly performs a tracking routine illustrated in FIG. 4 every sampling cycle of the observations ($R_z$, $V_z$, $\theta_z$). This implements the above functions F1 to F4, thus performing state estimation of targets using EKF trackers Q1.

When starting the tracking routine illustrated in FIG. 4, the control unit 110 captures the observations ($R_z$, $V_z$, $\theta_z$) for each target T from the radar apparatus 10 in step S110. Thereafter, the control unit 110 allocates the observations ($R_z$, $V_z$, $\theta_z$) for some targets, which have been being tracked by EKF trackers Q1, included in the observations ($R_z$, $V_z$, $\theta_z$) for all the targets T, to the EKF trackers Q1 of the corresponding targets in step S120.

The control unit 110 also allocates the observations ($R_z$, $V_z$, $\theta_z$) for some targets, which have been tracked by LKF trackers Q2, included in the remaining observations ($R_z$, $V_z$, $\theta_z$), to the LKF trackers Q2 of the corresponding targets in step S130.

The control unit 110 makes an affirmative determination in step S140 when the observations ($R_z$, $V_z$, $\theta_z$) for the respective targets captured in step S110 contain the observations ($R_z$, $V_z$, $\theta_z$) for new targets, which have not been being tracked by EKF and LKF trackers Q1 and Q2. Then, the control unit 110 carries out the operation in step S150.

In step S150, the control unit 110 generates a new LKF tracker Q2 for each of the new targets. The observations ($R_z$, $V_z$) are set as initial values of the state quantities (R, V) for each of the generated LKF trackers Q2. Thereafter, the routine proceeds to step S160. Otherwise, when making a negative determination in step S140 when there are no observations ($R_z$, $V_z$, $\theta_z$) for new targets, the control unit 110 carries out the operation in step S160 while skipping the operation in step S150.

In step S160, the control unit 110 determines whether the control unit 110 has performed the operations in step S180 and the subsequent steps for all the already generated trackers. Upon determination that the control unit 110 has not performed the operations (NO in step S160), the routine proceeds to step S170. In step S170, the control unit 110 selects, as a processing target tracker, one of the outstanding trackers, for which the operations in step S180 and the subsequent steps have not been performed, in all the already generated trackers.

Note that the already generated trackers are the generated EKF and LKF trackers Q1 and Q2 except for the newly generated trackers in the current tracking routine. That is, the newly generated trackers in the current tracking routine are removed from trackers to be selected.

After selecting a processing target tracker in step S170, the control unit 110 determines whether a target that has been being tracked by selected tracker has disappeared in step S180. How to determine whether the target has disappeared is to determine whether the observations ($R_z$, $V_z$, $\theta_z$) for the selected tracker have not been captured predetermined several times.

Upon determination that the target has disappeared (YES in step S180), the control unit 110 deletes the corresponding tracker, thus terminating the tracking of the corresponding target. Thereafter, the control unit 110 performs the operation in step S160 so that the processing target tracker is switched.

Otherwise, upon determination that the target has not disappeared (NO in step S180), the control unit 110 updates the processing target tracker in step S190. Specifically, the control unit 110 causes the processing target tracker to calculate posterior estimates of the state quantities at a current time according to the observations ($R_z$, $V_z$, $\theta_z$) in step S190. This updates the state quantities of the corresponding target that the processing target tracker maintains.

If the processing target tracker is an EKF tracker Q1, the EKF tracker Q1 calculates, i.e. updates, the posterior estimates of the state quantities (X, Y, Vx, Vy) of a corresponding target based on the extended Kalman filter. The state quantity Y represents a Y coordinate at the position of the corresponding target in an X-Y coordinate system when the longitudinal direction of the corresponding vehicle is set to the Y axis. The state quantity X represents an X coordinate at the position of the corresponding target in the X-Y coordinate system. The direction of the X axis is perpendicular to the Y axis and parallel to the ground, in other words, parallel to the alignment direction of the antenna elements 51. Reference character Vy represents a Y-axial component of the relative velocity of the corresponding target relative to the corresponding vehicle, and reference character Vx represents an X-axial component of the relative velocity of the corresponding target relative to the corresponding vehicle.

Updating of the state quantities (X, Y, Vx, Vy) is carried out according to the observations ($R_z$, $V_z$, $\theta_z$) and the prior estimates of the state quantities (X, Y, Vx, Vy). The first updating after the initial values of the state quantities is carried out based on the prior estimates of the state quantities (X, Y, Vx, Vy) corresponding to the initial values.

If new observations ($R_z$, $V_z$, $\theta_z$) are not allocated to the processing target tacker because the observations for a tracking target are not captured from the radar apparatus 10, the control unit 110 regards the prior estimates of the state quantities (X, Y, Vx, Vy) as values matching with the observations ($R_z$, $V_z$, $\theta_z$) to thereby update the state quantities (X, Y, Vx, Vy).

Otherwise, if the processing target tracker is an LKF tracker Q2, the LKF tracker Q2 calculates, i.e. updates, the posterior estimates of the state quantities (R, V) of a corresponding target based on the Kalman filter. Updating of the state quantities (R, V) is carried out according to the observations ($R_z$, $V_z$) and the prior estimates of the state quantities (R, V). As described above, estimation of the state quantities (R, V) does not use the observation $\theta_z$ for the orientation $\theta$.

The posterior estimates of the state quantities (R, V) calculated by the LKF tracker Q2 are used by the following process as the corrected values ($R_c$, $V_c$) of the observations ($R_z$, $V_z$). In step S190, the control unit 110 stores, in for example the RAM 115, the posterior estimates ($R_c$, $V_c$) calculated by the LKF tracker Q2 in addition to the observation $\theta_z$ for the orientation $\theta$ observed together with the observations ($R_z$, $V_z$) as the corrected observations ($R_c$, $V_c$, $\theta_z$) corresponding to the observations ($R_z$, $V_z$, $\theta_z$). In step S190, the control unit 110 also stores, in for example the RAM 115, the current number of updates of the processing target tracker.

After completion of the operation in step S190, the control unit 110 performs the switching of the operation according to whether the processing target tracker is an LKF tracker Q2 in step S200. Specifically, the control unit 110 carries out the operation in step S160 while skipping the operations in steps S210 and S220 upon determination that the processing target tracker is not an LKF tracker Q2 but an EKF tracker Q1 (NO in step S200).

Otherwise, upon determination that the processing target tracker is an LKF tracker Q2 (YES in step S200), the control unit 110 determines whether the number of updates of the processing target tracker in step S190, i.e. the number of updates stored in for example the RAM 15 in step S190, is equal to or more than a predetermined number (N+1) in step S210.

Figure 5:
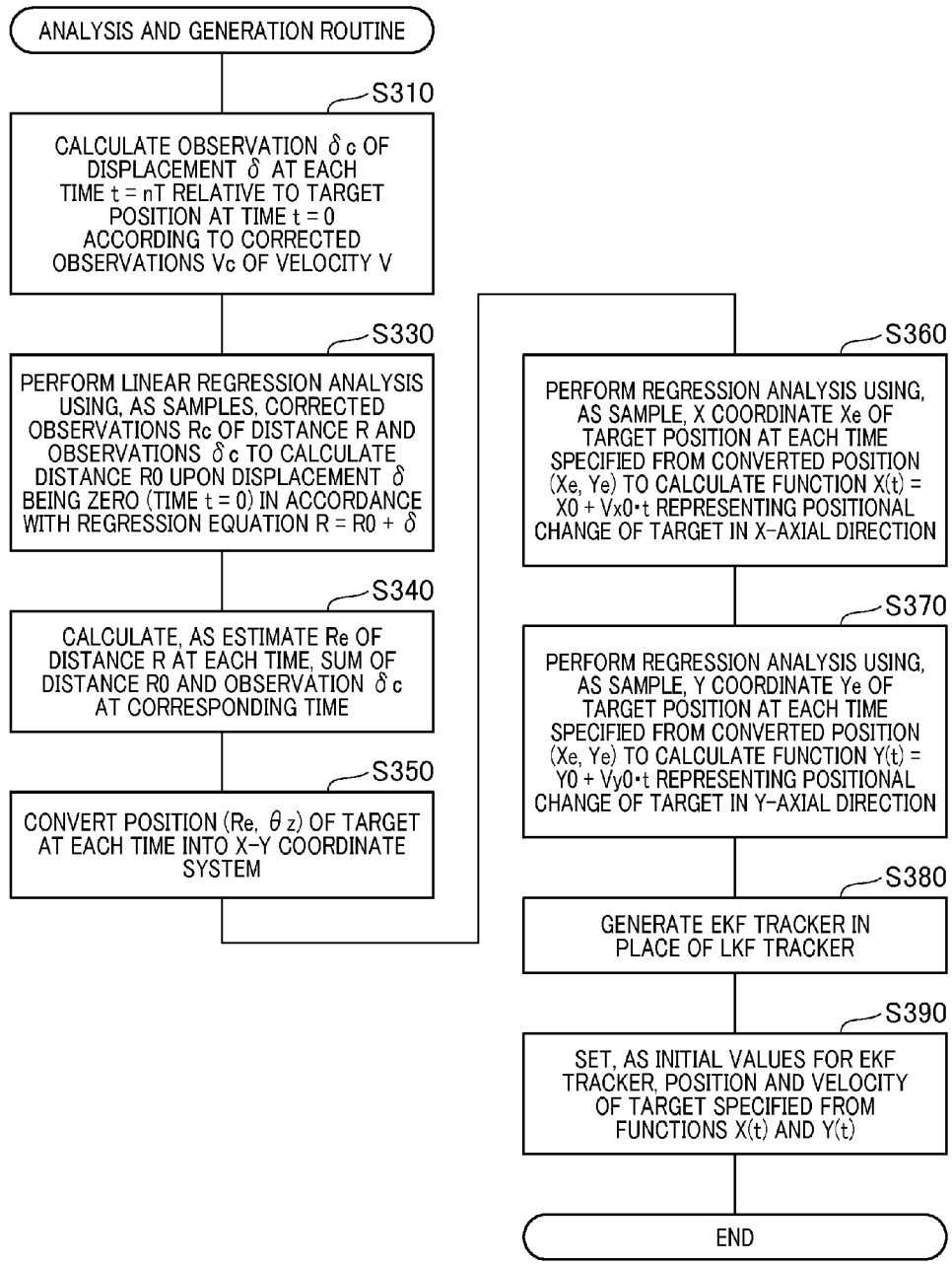
FIG. 5 is a flowchart illustrating an analysis and generation routine carried out by the control unit illustrated in FIG. 1.

Upon determination that the number of updates is equal to or more than the predetermined number (YES in step S210), the control unit 110 performs an analysis and generation routine illustrated in FIG. 5 in step S220. The analysis and generation routine includes the procedure to generate an EKF tracker Q1 in place of the processing target LKF tracker Q2, and set initial values for the EKF tracker Q1. After completion of the operation in step S220, the tracking routine proceeds to step S160. Otherwise, upon determination that the number of updates is less than the predetermined number (N+1), the control unit 110 makes a negative determination in step S210, and carries out the operation in step S160 while skipping the operation in step S220.

Specifically, the control unit 110 sequentially selects one of trackers included in the already generated trackers as a processing target tracker in step S170, and performs the operations in steps S180 and the subsequent operations, thus updating the state quantities of a corresponding target maintained by each of the trackers Q1 and Q2. Upon determination that the number of updates of an LKF tracker Q2 is equal to or more than the predetermined number (N+1), the control unit 110 performs the analysis and generation routine illustrated in FIG. 5, thus switching the LKF tracker Q2 to an EKF tracker Q1.

The control unit 110 performs the analysis and generation routine illustrated in FIG. 5. This accumulates the (N+1) number of the observations ($R_c$, $V_c$, $\theta_z$) including the corrected observations ($R_c$, $V_c$), and generates, according to the observations ($R_c$, $V_c$, $\theta_z$) an EKF tracker Q1 to which proper initial values have been set. Thereafter, the control unit 110 performs state estimation of the corresponding target using the EKF tracker Q1.

Next, the following describes the analysis and generation routine executed by the control unit 110 in detail with reference to FIG. 5.

When launching the analysis and generation routine, the control unit 110 calculates observations $\delta_c$ of displacement $\delta$ at each time t=nT within a predetermined period from a previous time t=0 to the current time, i.e. the time of the estimation, t=NT in accordance with the following equation [1]:

$$\delta_c[n] = \begin{cases} 0 & (n = 0) \\ \sum_{i=0}^{n-1} V_c[i] \cdot T & (n \geq 1) \end{cases} \quad [1]$$

Where n used in the equation [1] is 0, 1, ..., N, and T, which is a constant value, used in the equation [1] represents an execution cycle of the tracking routine illustrated in FIG. 4. T also matches with the sampling cycle of the observations ($R_z$, $V_z$, $\theta_z$). The observation time t of the initially obtained observations $V_c$ in the (N+1) number of the observations $V_c$ obtained by the (N+1) number of updates of an LKF tracker Q2 is defined as t=0. $V_c[i]$ used in the equation [1] represents the observations $V_c$ at each of the times t=iT (i=0, ..., n−1).

The displacement δ represents displacement of a corresponding target in the direction of the distance R relative to the reference position where the corresponding target was located at the time t=0. In step S310, the control unit 110 calculates the displacement δ in the direction of the distance R in accordance with the equation [1] when regarding the orientation θ is unchanged because displacement of the orientation θ is minute in comparison to the displacement of the distance R.

Specifically, in step S310, the control unit 110 calculates a temporal integral value of the observations $V_c$ from the time t=0 to the time t=nT as the observation $\delta_c[n]$ at each of the times t=nT associated with the displacement δ of a corresponding target that the processing target tracker Q2 tracks.

Thereafter, the control unit 110 performs linear regression analysis using the (N+1) number of the observations $R_c[n]$ (n=0, ..., N) and the calculated (N+1) number of the observations $\delta_c[n]$ (n=0, ..., N) as samples in step S330. Note that the observations $R_c[n]$ represents the observation $R_c$ at each of the times t=nT.

Specifically, the control unit 110 performs linear regression analysis using the distance R as an objective variable and the displacement δ as an explanatory variable in step S330; the linear regression is based on the observations $R_c$ and $\delta_c$ at each of the times within the predetermined period as samples. The relationship between the distance R and the displacement δ can be expressed as the equation R=R0+δ where R0 represents the value of the distance R at the reference position. Thus, the linear regression analysis uses the relational equation R=R0+δ as a regression expression, thus obtaining a value R0 of the intercept of the regression equation where squared error $\varepsilon^2$ expressed by the following equation [2] is minimized:

$$\varepsilon^2 = \sum_{n=0}^{N} |(R0 + \delta_c[n]) - R_c[n]|^2 \quad [2]$$

In step S303, the control unit 110 performs the linear regression analysis described above, thus calculating, as an estimate $R_e[0]$ of the distance R at the displacement δ being zero (δ=0) at the time t=0, the value R0 where the squared error $\varepsilon^2$ is minimized.

Thereafter, the control unit 110 calculates an estimate $R_e[N]$ of the distance R at each of the times t=nT (n=1, 2, ..., N) using the estimate $R_e[0]$ in accordance with the equation $R_e[n]=R_e[0]+\delta_c[n]$ in step S340. Specifically, the control unit 110 calculates the sum of the estimate $R_e[0]$ and the observation $\delta_c[n]$ of the displacement δ at each of the times t=nT as the estimate $R_e[n]$ of the distance R at each of the times t=nT.

Thereafter, the control unit 110 converts the estimates $(R_e[n], \theta_z[n])$ at the position (R, θ) of a corresponding target at each of the times t=nT (n=0, ..., N), which is specified by the estimates $R_e[n]$ of the distance R and the corresponding observations $\theta_z[n]$ of the orientation θ into estimates $(X_e[n], Y_e[n])$ of the position (X, Y) in the X-Y coordinate system using the following equations [3] and [4] in step S350:

$$X_e[n] = R_e[n] \cdot \cos(\theta_z(n)) \quad [3]$$

$$Y_e[n] = R_e[n] \cdot \sin(\theta_z(n)) \quad [4]$$

Where the X-Y coordinate system is an orthogonal coordinate system defined by the X-axis and the Y-axis.

Subsequently, the control unit 110 calculates a function X(t) based on linear regression analysis that uses, as samples, the X coordinates $X_e[n]$ of the positional estimates $(X_e[n], Y_e[n])$ at each of the times t=nT (n=0, ..., N) obtained by the conversion in step S360; the function X(t) represents the change of position of a corresponding target in the X-axis direction.

A uniform motion model can express the X coordinate X(t) of the position (X, Y) of a corresponding target at time t as the equation X(t)=X0+Vx0·t where X0 represents a value of the X coordinate at the position of a corresponding target at the time t=0, and $V_{x0}$ represents an X-axial component of the relative velocity V of the corresponding target relative to the corresponding vehicle.

In step S360, the control unit 110 performs linear regression analysis to calculate a value X0 of the intercept and a value of the gradient of the regression equation X(t)=X0+Vx0·t when squared error $\varepsilon^2$ of the regression equation X(t)=X0+Vx0·t with respect to the samples $X_e[n]$ (n=0, ..., N) are minimized. This calculates the function X(t) representing the correlations between time t and the X coordinates of the position of the corresponding target. The function X(t) corresponds to an approximate line obtained by plotting the samples $X_e[n]$ (n=0, ..., N) in the graph representing time t vs position X.

In addition, the control unit 110 calculates a function Y(t) based on linear regression analysis that uses, as samples, the Y coordinates $Y_e[n]$ of the positional estimates $(X_e[n], Y_e[n])$ at each of the times t=nT (n=0, ..., N) obtained by the conversion in step S370; the function Y(t) represents the change of position of a corresponding target in the Y-axis direction.

A uniform motion model can express the Y coordinate Y(t) of the position (X, Y) at time t as the equation Y(t)=Y0+Vy0·t where Y0 represents a value of the Y coordinate at the position of a corresponding target at the time t=0, and Vy0 represents a Y-axial component of the relative velocity V of the corresponding target relative to the corresponding vehicle.

In step S370, the control unit 110 performs linear regression analysis to calculate a value Y0 of the intercept and a value of the gradient of the regression equation Y(t)=Y0+Vy0·t when squared error $\varepsilon^2$ of the regression equation Y(t)=Y0+Vy0·t with respect to the samples $Y_e[n]$ (n=0, ..., N) are minimized. This calculates the function Y(t) representing the correlations between time t and the Y coordinates of the position of the corresponding target.

Thereafter, the control unit 110 deletes the processing target tracker Q2, and generates a new EKF tracker Q1 for tracking, as the tracking target, the target that the LKF tracker Q2 has tracked in step S380. Then, the control unit 110 sets the values {X(t=NT), Y(t=NT), Vx0, Vy0} as the initial values of the state quantities (X, Y, Vx, Vy) for the generated EKF tracker Q1 in step S390.

Specifically, the control unit 110 sets the position X(t=NT) at the current time t=NT in accordance with the function X(t) calculated in step S360 as the initial value of the state quantity X. The control unit 110 sets the position Y(t=NT) at the current time t=NT in accordance with the function Y(t) calculated in step S370 as the initial value of the state quantity Y.

Additionally, the control unit 110 sets the gradient Vx0 of the function X(t) as the initial value for the state quantity Vx, and also sets the gradient Vy0 of the function Y(t) as the initial value for the state quantity Vy.

Subsequently, the control unit 110 terminates the analysis and generation routine. The above procedure of the this embodiment sets the initial values for the EKF tracker Q1. Thereafter, the control unit 110 performs, according to the EKF tracker Q1, state estimation of the corresponding target.

The tracking routine of this embodiment has been described as set forth above. Specifically, the control unit 110 of this embodiment corrects, i.e. smooths, the observations ($R_z$, $V_z$) for a new target obtained from the radar apparatus 10 using the LKF tracker Q2 when the new target appears before setting initial values for an EKF tracker Q1. Then, the control unit 110 sets, according to the corrected observations ($R_c$, $V_c$), initial values for an EKF tracker Q1.

The dual frequency CW radar apparatus 10 is configured to calculate the observation $R_z$ for the distance R to a target according to the phase information included in the received signal based on an echo set forth above. This configuration might result in the obtained observations $R_z$ having relatively low accuracy, resulting in variations in the obtained observations $R_z$.

In contrast, the correcting process carried out by the control unit 110 of this embodiment using an LKF tracker Q2 reduces such variations. Thus, the control unit 110 of this embodiment prevents relatively low observation accuracy of the distance R from negatively affecting on the setting of initial values to an EKF tracker Q1.

In addition, the dual frequency CW radar apparatus 10 is configured to calculate the observation $V_z$ for the relative velocity of a target according to the frequency information included in the received signal set forth above. This configuration results in the accuracy of the observations $V_z$ being higher than that of the observations $R_z$. The control unit 110 of this embodiment uses the difference in accuracy to perform the operations in steps S310, S330, and S340, thus estimating the distance R to a target with higher accuracy.

Specifically, the control unit 110 estimates the distance R=R0 at the time t=0 according to the observations $δ_c$ for the displacement δ obtained from the observations $V_z$ having higher accuracy. Then, the control unit 110 calculates the estimate $R_e[n]$ of the distance R at each of the times t=NT (n=0, . . . , N) according to the distance R0 and the observations $δ_c$ having higher accuracy. Thus, the control unit 110 of this embodiment sets proper initial values for an EKF tracker Q1.

A conventional technology performs linear regression analysis using the time t as an explanatory variable and the distance R as an objective variable to thereby calculate estimates of the distance R corresponding to the observations $R_z$, and sets initial values for a tracker according to the calculated estimates.

Figure 6:
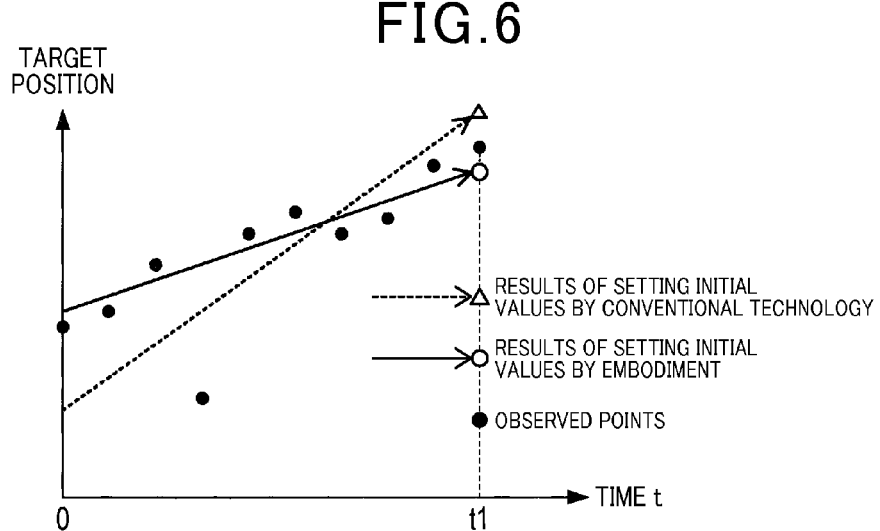
FIG. 6 is a graph illustrating the results of setting initial values obtained from the embodiment in comparison to the results of setting initial values obtained from a conventional example.

Unfortunately, the conventional technology shows that a regression line obtained by the regression analysis, illustrated by a dashed line in FIG. 6, suffers strong effects from the observations $R_z$ for the distance R, each of which has a substantial margin of error with respect to a corresponding true value. This causes the position of a target as initial values of state quantities to be set to a tracker at time t1 according to the regression line to widely deviate from a corresponding true position as illustrated by the triangular point plotted in FIG. 6.

In contrast, the control unit 110 of this embodiment executes regression analysis using the distance R as an objective variable and the displacement δ as an explanatory variable according to the displacement values $δ_c$ based on the observations $V_c$ of the velocity V having higher accuracy. The execution of the regression analysis calculates estimates $R_e$ of the distance R corresponding to the observations $R_c$. This enables the estimates $R_e$ to be obtained with higher accuracy with little influence from the observations each having a substantial margin of error with respect to a corresponding true value.

Thus, the control unit 110 of this embodiment properly sets the position of a target, which represents initial values of state quantities for an EKF tracker Q1, to have a smaller margin of error relative to a corresponding true position as illustrated by the white circle plotted in FIG. 6.

Figure 7:
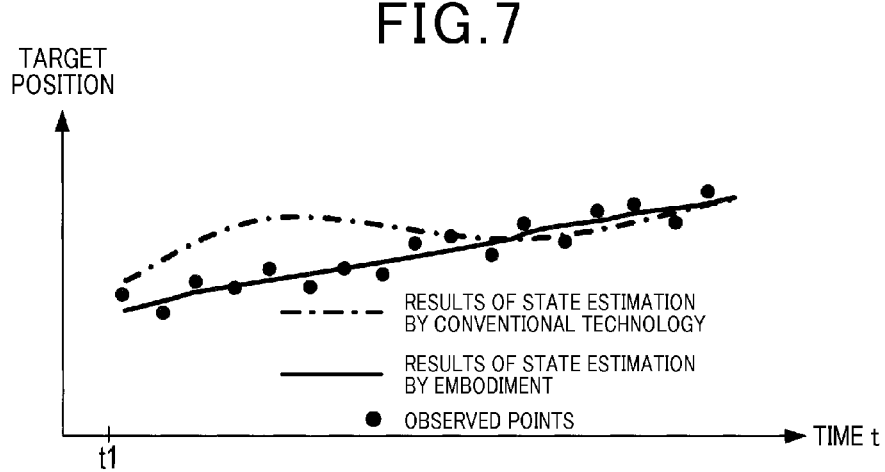
FIG. 7 is a graph illustrating the results of state estimation obtained from the embodiment of the present disclosure in comparison to the results of state estimation obtained from the conventional example.

As illustrated in the solid line illustrated in FIG. 7, when performing state estimation of a target using an EKF tracker Q1 after time t1 at which the proper initial values are set, the control unit 110 of this embodiment makes it possible to calculate estimates of the state quantities (X, Y, Vx, Vy) of the target with higher accuracy at an early stage of the state estimation.

In contrast, let us consider a case where initial values are set for an EKF tracker based on the conventional technology. In this case, because each of the initial values has a substantial margin of error with respect to a corresponding true value, it takes time to perform state estimation with high accuracy as illustrated by the dot-and-dash line in FIG. 7. The dot-and-dash line illustrated in FIG. 7 shows the trajectory of estimates of state quantities by an EKF tracker Q1 for which initial values of state quantities, which are greater than corresponding true values, have been set.

FIG. 7 demonstrates that initial values set to be greater than corresponding true values result in the estimates of the state quantities calculated by the EKF tracker Q1 deviating upward from the corresponding true values. As described above, the conventional technology cannot perform state estimation of a target by an EKF tracker Q1 with high accuracy at an early stage of the state estimation.

In contrast, this embodiment enables proper initial values with higher accuracy to be set, making it possible to perform state estimation of a target using an EKF tracker Q1 at an earlier stage.

In addition, the control unit 110 of this embodiment converts the position (R, θ) of a target into that in an X-Y coordinate system, and performs, when setting initial values for an EKF tracker Q1, further regression analysis while considering the observations $θ_z$ including errors.

Specifically, the control unit 110 of this embodiment converts the estimates ($R_e[n]$, $θ_z[n]$) of a target into estimates ($X_e[n]$, $Y_e[n]$) of the position (X, Y) in the X-Y coordinate system in step S350. Thereafter, the control unit 110 performs further regression analysis based on the estimates ($X_e[n]$, $Y_e[n]$) in steps S360 and S370. Then, the control unit 110 of this embodiment sets initial values resulting from the regression analysis for an EKF tracker Q1, thus reducing errors in the initial values due to errors in observation of the orientation θ.

Thus, the control unit 110 of this embodiment further properly sets initial values, making it possible to construct, as the state estimation system for targets using EKF trackers Q1, a superior system.

[Other Embodiments]

This embodiment of the present disclosure has been described, but the present disclosure is not limited to this embodiment, and can be variably modified.

The control unit 110 of this embodiment corrects, i.e. smooths, the observations ($R_z$, $V_z$) obtained from the radar apparatus 10 using an LKF tracker Q2, and calculates estimates $R_e$ of the distance R of a target according to the corrected observations ($R_c$, $V_c$). However, the control unit 110 can calculate the estimates $R_e$ according to the observations ($R_z$, $V_z$) obtained from the radar apparatus 10 without using the corrected observations ($R_c$, $V_c$) based on the LKF tracker Q2.

Specifically, the control unit 110 can perform the operations in steps S310 to S340 of the analysis and generation routine using the observations ($R_z$, $V_z$) in place of the corrected observations ($R_c$, $V_c$), thus calculating the estimates $R_e$ of the distance R.

The control unit 110 of this embodiment calculates the estimates $R_e$ of the distance R in the procedure of steps S310 to S340 to set initial values for an EKF tracker Q1. However, the present disclosure can use the calculation technology for various purposes other than the object for setting initial values.

Specifically, the technology of calculating the estimates $R_e$ of the distance R is a technology of correcting the observations $R_z$ of the distance R using the higher accuracy of observation of the velocity V if the accuracy of observation of the distance R is lower than that of observation of the velocity V. Thus, the present disclosure can be used to simply correct the observations $R_z$ without the limitation of setting initial values.

This embodiment uses a linear Kalman filter and an extended Kalman filter as a non-linear Kalman filter as examples of state estimation filters to perform state estimation of a target, but can use another type of state estimation filters.

[Correspondence]

The drive assist ECU 100 of this embodiment corresponds to an example of an estimation apparatus, and the radar apparatus 10 corresponds to an example of an observer. The operation in step S310 executed by the control unit 110 of the drive assist ECU 100 corresponds to an example of an operation implementable by displacement calculation means. The operations in steps S330 and S340 executed by the control unit 110 corresponds to an example of an operation implementable by distance estimation means.

In addition, the operations in steps S130 to S150 and S190 executed by the control unit 110 correspond to an example of an operation implementable by correction means. The operations in steps S350 to S370 executed by the control unit 110 correspond to an example of an operation implementable by position estimation means. The operation in step S350 corresponds to an example of an operation implementable by conversion means.

An updating operation of state quantities maintained by an EKF tracker Q1, which is implementable by the operation in step S190 executed by the control unit 110 corresponds to an example of an operation implementable by state estimation means. The operation in step S390 executed by the control unit 110 corresponds to an example of an operation implementable by an initial value setting means.

REFERENCE SIGNS LIST

| | |
|---|---|
| 1 . . . In-vehicle system | 10 . . . Radar apparatus |
| 20 . . . Transmission circuit | 30 . . . Distributor |
| 40 . . . Transmission antenna | 50 . . . Receiving antenna |
| 51 . . . Antenna element | 60 . . . Receiving circuit |
| 61 . . . Mixer | 70 . . . Processing unit |
| 80 . . . Output unit | 100 . . . Drive assist ECU |
| 110 . . . Control unit | 111 . . . CPU |
| 113 . . . ROM | 115 . . . RAM |
| 120 . . . Input unit | 200 . . . Controlled target |
| BT . . . Beat signal | F1 . . . Allocating function |
| F2 . . . Correcting function | F3 . . . Regression analysis function |
| F4 . . . EKF tracker generating function | L . . . Local signal |
| K1, K2 . . . Vehicle | Ss . . . Transmission signal |
| Sr . . . Received signal | |
| Q1, Q2 . . . Tracker | |

The invention claimed is:

1. A forward object estimation apparatus for a vehicle to detect a forward object and preventing collision between the vehicle and the forward object, the forward object estimation apparatus comprising:

a radar unit configured to detect a distance, a velocity and an orientation of the forward object using radar waves, the radar unit outputting a distance observation, a velocity observation and an orientation observation regarding the forward object;

a drive assist electronic control unit (ECU) configured to receive the distance information, the velocity information and the orientation information from the radar unit, the drive assist ECU comprising:

a displacement calculator configured to use the velocity observation at each of times within a predetermined period to calculate, for each of the times, a temporal integral value of the velocity observations from a start time of the predetermined period to a corresponding one of the times, the temporal integral value calculated for each of the times serving as a displacement observation of the forward target within the start time to a corresponding one of the times; and a distance estimator configured to:

perform regression analysis using, as samples, the distance observations and the displacement observations at the respective times within the predetermined period, the regression analysis being based on the distance as an objective variable and the displacement as an explanatory variable; and estimate that a value of the distance upon a value of the displacement calculated in accordance with a regression equation based on the regression analysis being zero shows a value of the distance to the forward object at the start time, and an output unit configured to output a target control signal based on the value of the distance to the forward object at the start time; and a controller target unit configured to receive the target control signal and perform a vehicle control to perform at least one of:

preventing collision with the forward object based on the target control signal; and warning about the forward object based on the target control signal.

2. The estimation apparatus according to claim 1, further comprising:

a correction unit configured to perform state estimation of the forward object using a state estimation filter based on a linear state space model to correct the distance observations and the velocity observations at the respective times, wherein:
the displacement calculator calculates, as the displacement observation at each of the times, a temporal integral value of the corrected velocity observations by the correction unit; and
the distance estimator performs the regression analysis using, as the samples, the corrected distance observations at the respective times by the correction unit and the displacement observations at the respective times.

3. The estimation apparatus according to claim 2, wherein:
the state estimation filter based on the linear state space model is a linear Kalman filter.

4. The estimation apparatus according to claim 3, wherein:
the distance estimator estimates, as a value of the distance at each of the times, a sum of the estimated value of the distance at the start time and the displacement observation at a corresponding one of the times.

5. The estimation apparatus according to claim 2, wherein:
the distance estimator estimates, as a value of the distance at each of the times, a sum of the estimated value of the distance at the start time and the displacement observation at a corresponding one of the times.

6. The estimation apparatus according to claim 1, wherein:
the distance estimator estimates, as a value of the distance at each of the times, a sum of the estimated value of the distance at the start time and the displacement observation at a corresponding one of the times.

7. The estimation apparatus according to claim 6, wherein:
the observer comprises an apparatus for further observing an orientation of the forward object,
the estimation apparatus further comprising:
a position estimator configured to estimate, according to the value of the distance at each of the times estimated by the distance estimator and observations of the orientation by the observer, a position of the forward object in an orthogonal coordinate system at each of the times.

8. The estimation apparatus according to claim 7, wherein:
the position estimator comprises:
a conversion unit configured to convert a position of the forward object at each of the times into a position of the forward object in an X-Y coordinate system as the orthogonal coordinate system at a corresponding one of the times, the position of the forward object at each of the times being specified based on the value of the distance at a corresponding one of the times estimated by the distance estimator and a corresponding value of the orientation observations,
the position estimator being configured to:
perform regression analysis using, as samples, an X coordinate of the position at each of the times obtained by the conversion to calculate a function representing a correlation between the time and the X coordinates; and
perform regression analysis using, as samples, a Y coordinate of the position at each of the times to calculate a function representing a correlation between the time and the Y coordinates, thus estimating the position of the forward object at each of the times.

9. The estimation apparatus according to claim 8, further comprising:
a state estimator configured to estimate the position and the velocity of the forward object using a state estimation filter based on a non-linear state space model; and
an initial value setting unit configured to set, as initial values associated with the respective position and velocity of the forward object for the state estimation filter used by the state estimator, a position and velocity of the forward object at a time corresponding to the initial values,
the position and velocity at the time corresponding to the initial values being specified from the position estimated by the position estimator.

10. The estimation apparatus according to claim 9, wherein:
the state estimation filter based on the non-linear state space model is a non-linear Kalman filter.

11. The estimation apparatus according to claim 10, wherein:
the non-linear Kalman filter is an extended Kalman filter.

12. The estimation apparatus according to claim 7, further comprising:
a state estimator configured to estimate the position and the velocity of the forward object using a state estimation filter based on a non-linear state space model; and
an initial value setting unit configured to set, as initial values associated with the respective position and velocity of the forward object for the state estimation filter used by the state estimator, a position and velocity of the forward object at a time corresponding to the initial values,
the position and velocity at the time corresponding to the initial values being specified from the position estimated by the position estimator.

* * * * *